United States Patent
Schellens

(10) Patent No.: US 9,162,628 B2
(45) Date of Patent: Oct. 20, 2015

(54) VEHICLE MOUNTING PLATFORM USING EXISTING OPENING

(71) Applicant: Thomas E. Schellens, Old Lyme, CT (US)

(72) Inventor: Thomas E. Schellens, Old Lyme, CT (US)

(*) Notice: Subject to any disclaimer, the term of this patent is extended or adjusted under 35 U.S.C. 154(b) by 0 days.

(21) Appl. No.: 13/969,656

(22) Filed: Aug. 19, 2013

(65) Prior Publication Data

US 2014/0014698 A1 Jan. 16, 2014

Related U.S. Application Data

(62) Division of application No. 12/587,451, filed on Oct. 7, 2009, now Pat. No. 8,511,526.

(60) Provisional application No. 61/196,392, filed on Oct. 17, 2008.

(51) Int. Cl.
*B60R 9/04* (2006.01)
*B60Q 1/26* (2006.01)
*B60Q 1/30* (2006.01)
*B60R 9/058* (2006.01)

(52) U.S. Cl.
CPC .............. *B60R 9/04* (2013.01); *B60Q 1/2611* (2013.01); *B60Q 1/2615* (2013.01); *B60Q 1/302* (2013.01); *B60R 9/058* (2013.01); *B60Q 2900/10* (2013.01); *Y10T 29/49002* (2015.01); *Y10T 29/49826* (2015.01); *Y10T 29/49963* (2015.01)

(58) Field of Classification Search
CPC .......... B60R 9/058; B60R 9/04; B60Q 1/302; B60Q 1/2611; B60Q 1/2615; B60Q 2900/10; Y10T 29/499963; Y10T 29/49826; Y10T 29/49002

See application file for complete search history.

(56) References Cited

U.S. PATENT DOCUMENTS

| | | | |
|---|---|---|---|
| 2,779,524 A | 1/1957 | Carlson | 224/492 |
| 5,130,906 A | 7/1992 | Lund | 362/485 |
| 5,918,929 A | 7/1999 | Vagis | 296/210 |
| 6,530,621 B1 | 3/2003 | Williams et al. | 296/16.04 |
| 7,399,024 B2 | 7/2008 | Ordonio, Jr. et al. | 296/180.1 |
| 8,567,649 B1 * | 10/2013 | Cabak | 224/312 |
| 8,757,662 B2 * | 6/2014 | Deschambault | 280/756 |

OTHER PUBLICATIONS

Printed advertisement, title "CTLM Cab-Top Light Mount", BAJA Champions, one page, undated.
2008 Catalog, Bully, Pilot Automotive, Cover page, p. 54, last page.

* cited by examiner

*Primary Examiner* — Amy Sterling
(74) *Attorney, Agent, or Firm* — Fattibene and Fattibene et al; Paul A. Fattibene

(57) ABSTRACT

A mounting platform attached to a vehicle through an existing opening. A base portion having a clamp is placed through a brake light assembly opening, after the brake light assembly has been removed, and is securely held to the roof of a vehicle. A platform portion is attached to the base portion. The mounting platform is used to mount accessories such as light bars, emergency lights, antennas, or any other accessory desired to be mounted to the vehicle. The mounting platform may be easily installed and removed from the vehicle without any damage or modification to the vehicle and without drilling any additional holes in the vehicle.

10 Claims, 6 Drawing Sheets

VEHICLE MOUNTING PLATFORM USING EXISTING OPENING

RELATED APPLICATION

This application is a divisional of application Ser. No. 12/587,451 filed Oct. 7, 2009, which claims the benefit of U.S. Provisional Application No. 61/196,392, filed Oct. 17, 2008.

FIELD OF THE INVENTION

The present invention relates in general to the attachment of vehicle accessories, and more particularly to the attachment of vehicle accessories without modification or damage to the vehicle.

BACKGROUND OF THE INVENTION

There are many situations where an accessory is desired to be attached to a vehicle. It is often desired to attach light bars, emergency lights, antennas or other accessories to a vehicle and, in particular, to the roof of a vehicle. Often, in order to attach these accessories, holes must be drilled in the vehicle, such as in the roof, so as to mount the accessory. The mounting of the accessory by drilling holes damages the surface of the vehicle and lowers the resale value. Additionally, it is often difficult to return the vehicle to the original condition due to the damage caused by mounting the accessory. In many situations, the accessory is only needed for a short period of time. Therefore, it is often desirable to mount and then remove the accessory without modifying or permanently altering or damaging the vehicle. This is particularly applicable to volunteer emergency personnel who may volunteer for a period of time using their own vehicles that must be modified to mount emergency lights.

While there have been techniques to temporarily mount emergency lights with magnets and suction cups, they often do not hold sufficiently and therefore often become detached unintentionally. Therefore, there is a need for the mounting of accessories on a vehicle that is secure and that yet will not damage the vehicle or require permanent alteration, such as the drilling of additional holes in the vehicle.

SUMMARY OF THE INVENTION

The present invention provides a mounting platform that is securely attached to a vehicle through use of an existing opening. A mounting platform is attached to the vehicle through an existing opening, such as the opening for a center mounted brake light. A base portion, having a clamp inserted into the opening formed by the removal of the brake light, is secured to the vehicle. A platform portion mounts on the base portion forming a mounting platform for accessories such as emergency lights, light bars, antennas or other similar accessories. The present invention is particularly adaptable to the mounting of a mounting platform on the roof of a truck having a center mounted brake light on the cab.

Accordingly, it is an object of the present invention to attach an accessory to a vehicle without modifying or damaging the vehicle.

It is an advantage of the present invention that the mounting platform may be easily installed and removed.

It is a further advantage of the present invention that the mounting platform may be attached to the vehicle without the drilling of any holes.

It is a feature of the present invention that it uses an existing opening in the vehicle to securely attach the mounting platform.

It is another feature of the present invention that a clamp is inserted into the existing opening and securely holds a base portion onto the vehicle for attachment of the platform portion.

These and other objects, advantages, and features will become readily apparent in view of the following more detailed description.

DETAILED DESCRIPTION OF THE PREFERRED EMBODIMENT

Figure 1:
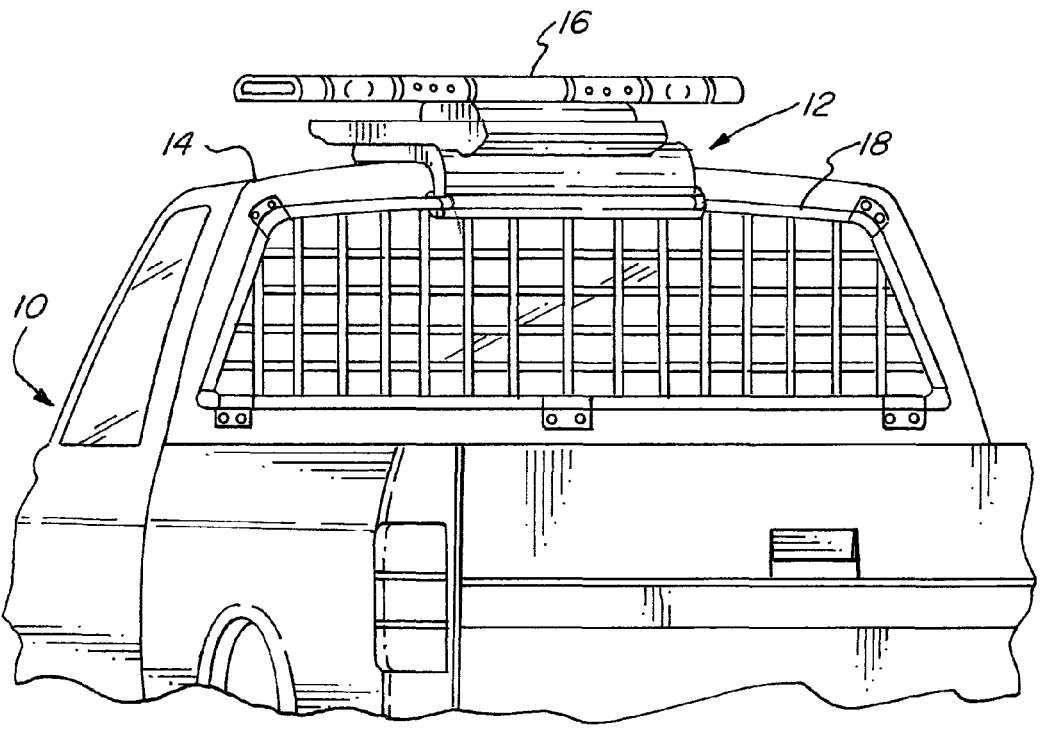
FIG. 1 schematically illustrates a mounting platform attached to the roof of a truck.

FIG. 1 schematically illustrates the mounting platform 12 attached to the roof 14 of a pickup truck 10. The pickup truck 10 has a center mounted brake light which is often referred to in the automotive trade as a CHIMSEL, which generally refers to a cab-high, rear tail light assembly. This light assembly is often placed in a hole referred to as the CHIMSEL hole. The mounting platform 12 is attached through the CHIMSEL hole or opening near the roof 14 on the cab of the truck 10. The mounting platform 12 may also be used to attach a window screen 18 so as to protect the rear window of the truck 10 without drilling any holes in the cab of the truck 10. A light bar 16 may also be mounted on the mounting platform 12. Other accessories such as emergency lights, antennas, or any other accessory desired, may be mounted on the mounting platform 12.

Figure 2:
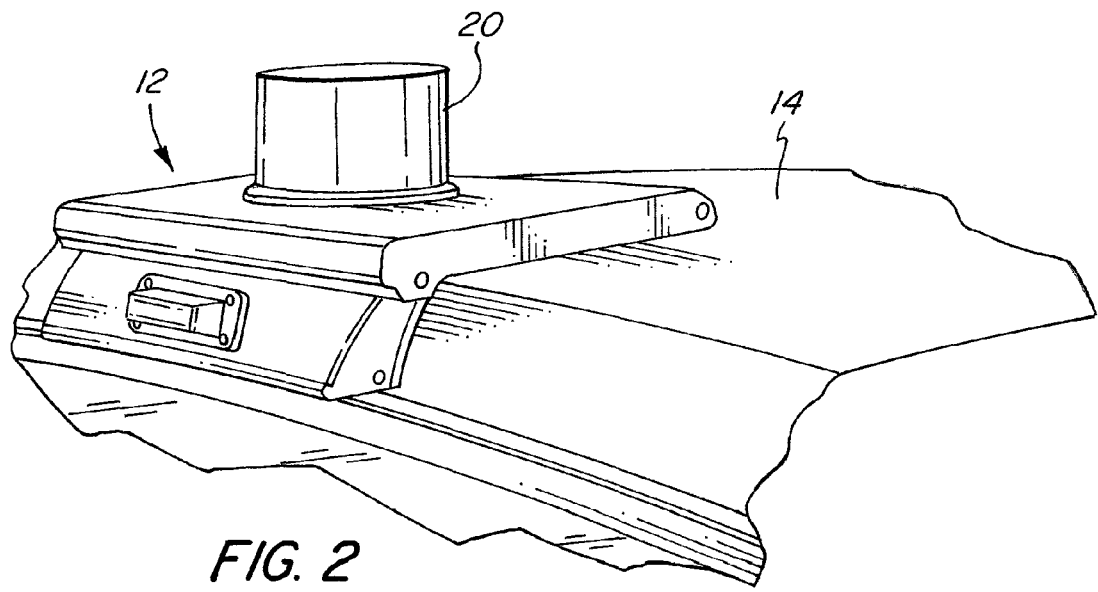
FIG. 2 is a perspective view illustrating the attachment of a mounting platform onto the roof of a vehicle.

FIG. 2 is a perspective view more clearly illustrating the mounting platform 12 attached to the roof 14 of the vehicle with an emergency light 20 attached. The mounting platform 12 is particularly suited to mounting in a CHIMSEL hole used for a brake light assembly, but may be mounted in any suitable opening in the vehicle.

Figure 3:
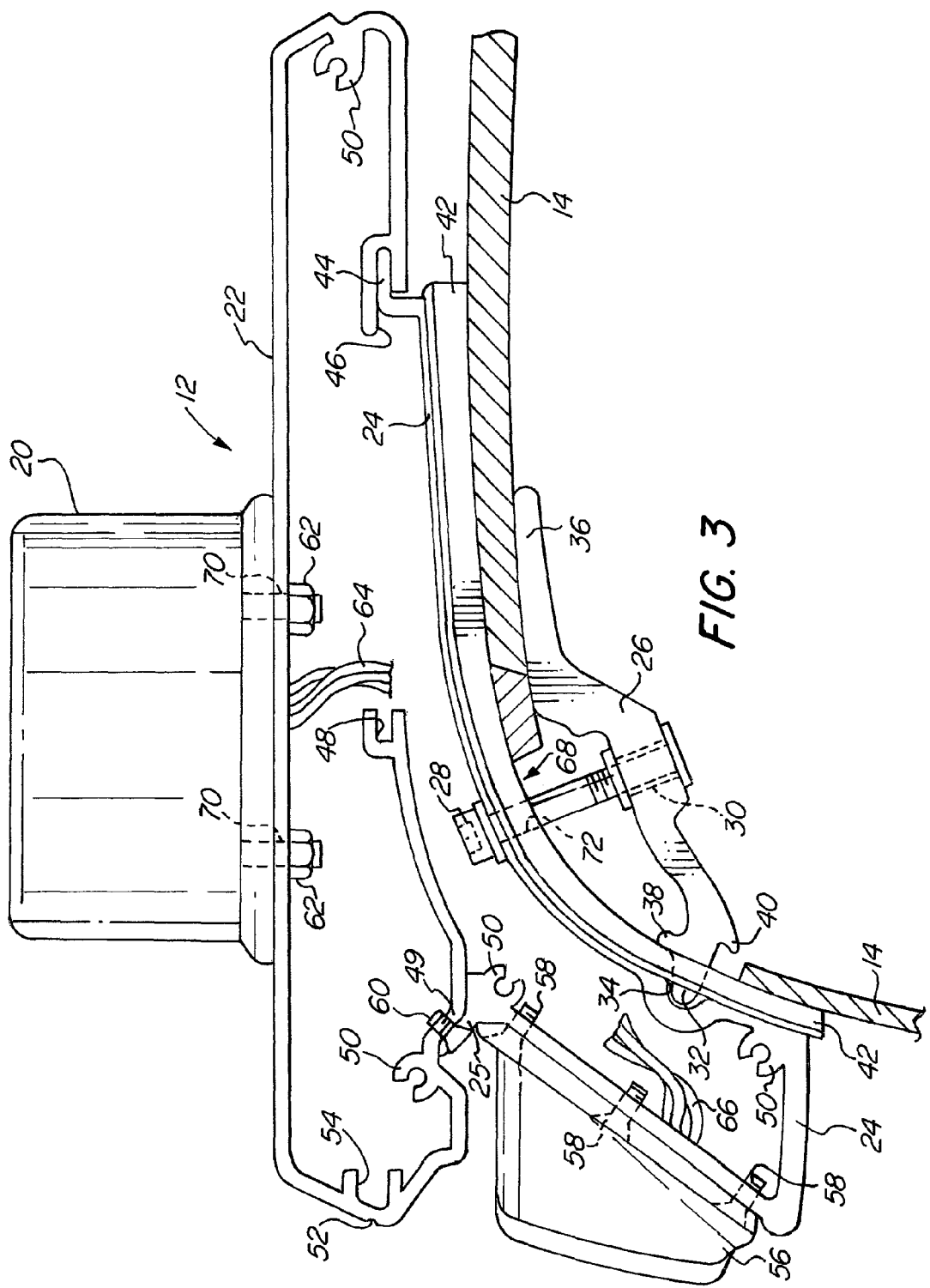
FIG. 3 schematically illustrates a partial cross-section of the mounting platform attached to a vehicle.

FIG. 3 is a cross section of an embodiment of the mounting platform 12. The mounting platform 12 comprises a platform portion 22 and a base portion 24. The base portion 24 preferably has a shape that matches or conforms to the shape of the roof 14. The base portion 24 is secured to the roof 14 of a vehicle by clamp 26 being placed through the opening 69, which is preferably the opening formed by the removal of the CHIMSEL light assembly, brake light assembly or other openings formed in the vehicle. The clamp 26 has a foot 36 on one end, the distal end, and a hinge element 32 on the opposing end, the proximal end. Adjacent the hinge element 32 is an upper stop 38 and a lower stop 40. The hinge element 32 is placed within a recess 34 formed in the base portion 24. The hinge element 32 when placed within the recess 34 acts as a hinge or ball joint so that the clamp 26 can be pivoted up and down. The end of the clamp 26 having the hinge element 32 is securely held within the recess 34. Accordingly, the base portion 24 may be securely held to the roof 14 when the clamp 26 is placed through the opening 68 and the bolt 28 is tightened. The bolt 28 is placed through a hole 72 formed in the base portion 24 and is threaded into threaded hole 30 in the clamp 26. A seal 42 is placed between the roof 14 and the base portion 24 to prevent moisture from entering the opening 68 as well as to protect the finished surface of the roof 14. The removed or another brake light 56 may be attached with screws 58 to the base portion 24. Brake light wires 66 may be reattached to the electrical system of the vehicle through the opening 68

With the base portion 24 securely attached to the roof 14 of the vehicle by clamp 26, the platform portion 22 may be attached to the base portion 24. The base portion 24 has a front stepped surface 44 that slides within a front channel 46 formed on the platform portion 22. A mid-channel 48 is also formed in the platform portion 22 for holding a filler element, not illustrated. A platform portion rear mounting surface 49 is shaped to receive a base portion rear mounting surface 25 formed on the base portion 24. The platform portion rear mounting surface 49 and the mating base portion rear mounting surface 25 are held together by screw 60. Accordingly, the platform portion 22 is securely held to the base portion 24 preventing any relative movement.

Both the platform portion 22 and the base portion 24 have screw bosses 50 that are used for the attachment of side covers, not illustrated. The platform portion 22 may also have an accessory boss 54 located by dimple 52. Another accessory may be attached to the platform portion 22 by drilling a hole through the dimple 52. Emergency light 20 is attached to the platform portion 22 by nuts and bolts 62 that are placed through holes 70. Emergency light wires 64 may be attached to the vehicles electrical system through the opening 68.

Figure 4:
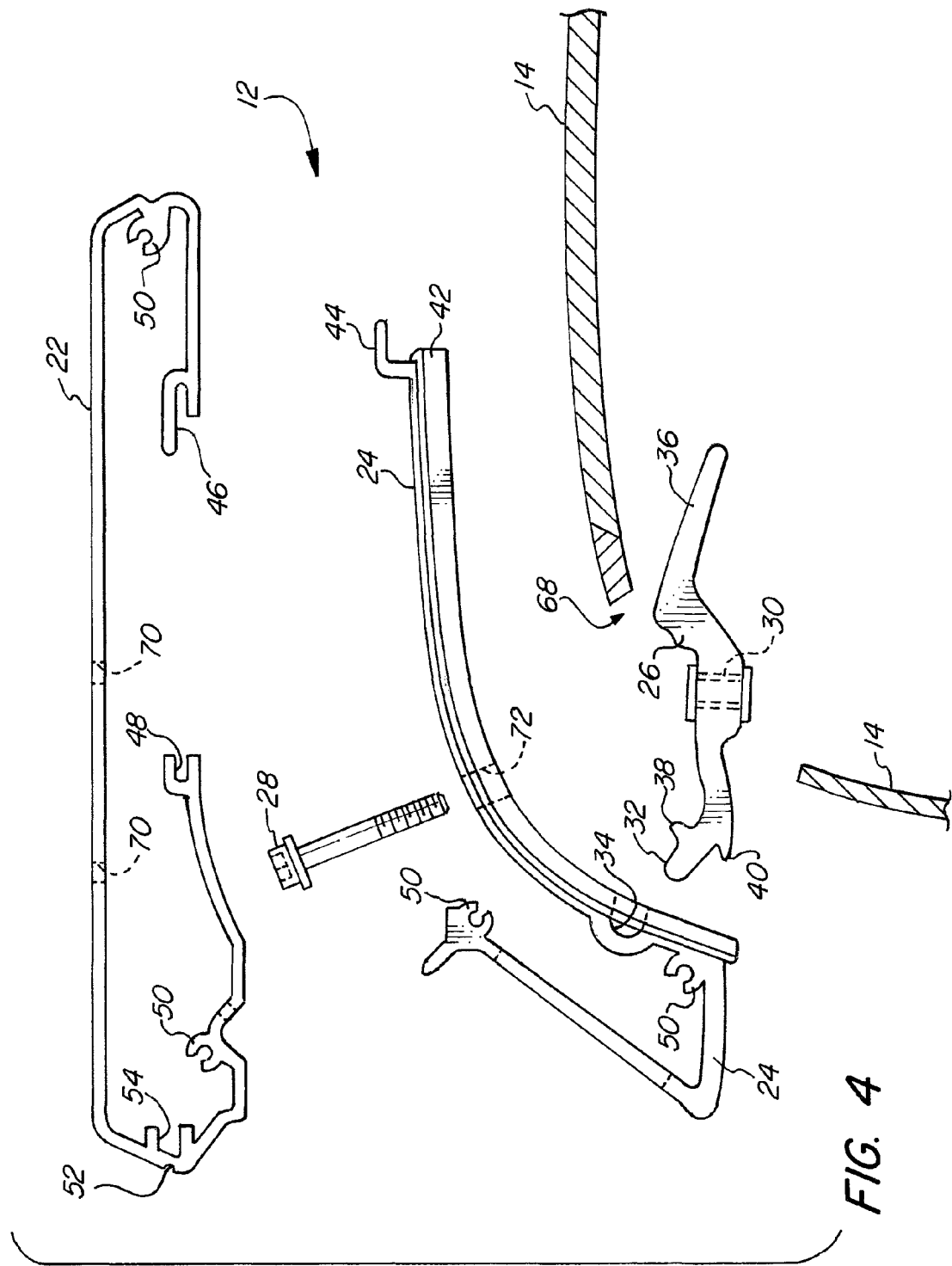
FIG. 4 is an exploded view of the mounting platform illustrated in FIG. 3.

FIG. 4 is an exploded view more clearly illustrating the assembly of the mounting platform 12 illustrated in FIG. 3. FIG. 4 more clearly illustrates the insertion of clamp 26 into the opening 68. The combination of the recess 34 and the hinge element 32 permits the clamp 26 to be fixed at one end and yet rotated up and down so as to be easily placed through opening 68 and rotated up by tightening bolt 28 causing the foot 36 to securely sandwich the roof 14 between the foot 36 and the base portion 24. Accordingly the base portion 24 is securely attached to the roof 14 without the need of drilling any holes or modifying the roof of the vehicle. The upper stop 38 and lower stop 40 on the clamp 26 are used to limit the angle of rotation of the clamp 26 to facilitate placement of clamp 26 within the opening 68.

Figure 5:
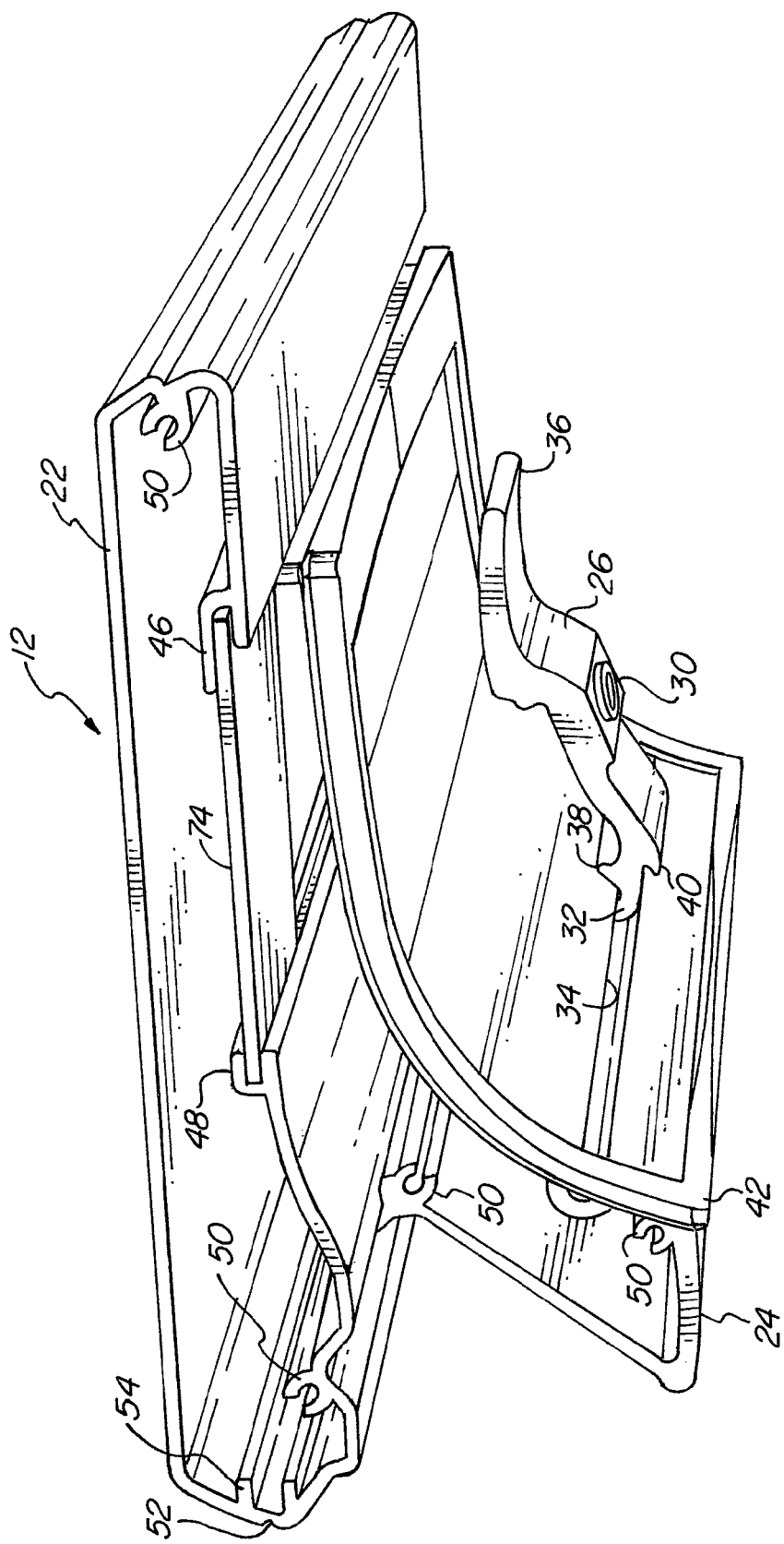
FIG. 5 is a perspective view of the mounting platform with side covers removed.

FIG. 5 is a perspective view clearly illustrating a side of the mounting platform 12. The recess 34 in which the hinge element 32 is placed is more clearly illustrated. The hinge element 26 can be slid or moved along the recess 34 so as more accurately position the clamp 26 at different lateral locations. Additionally, for a more secure attachment, additional clamps 26 may be used. FIG. 5 additionally illustrates the use of a filler 74 that may be placed within the mid channel 48 and the front channel 46 in the event that the platform portion 22 is wider than the base portion 24. The filler 74 prevents moisture and dirt from entering the mounting platform and helps to seal the mounting platform from the elements. The filler 74 also provides a degree of flexibility in selecting the width of the platform portion 22 relative to the base portion 24.

Figure 6:
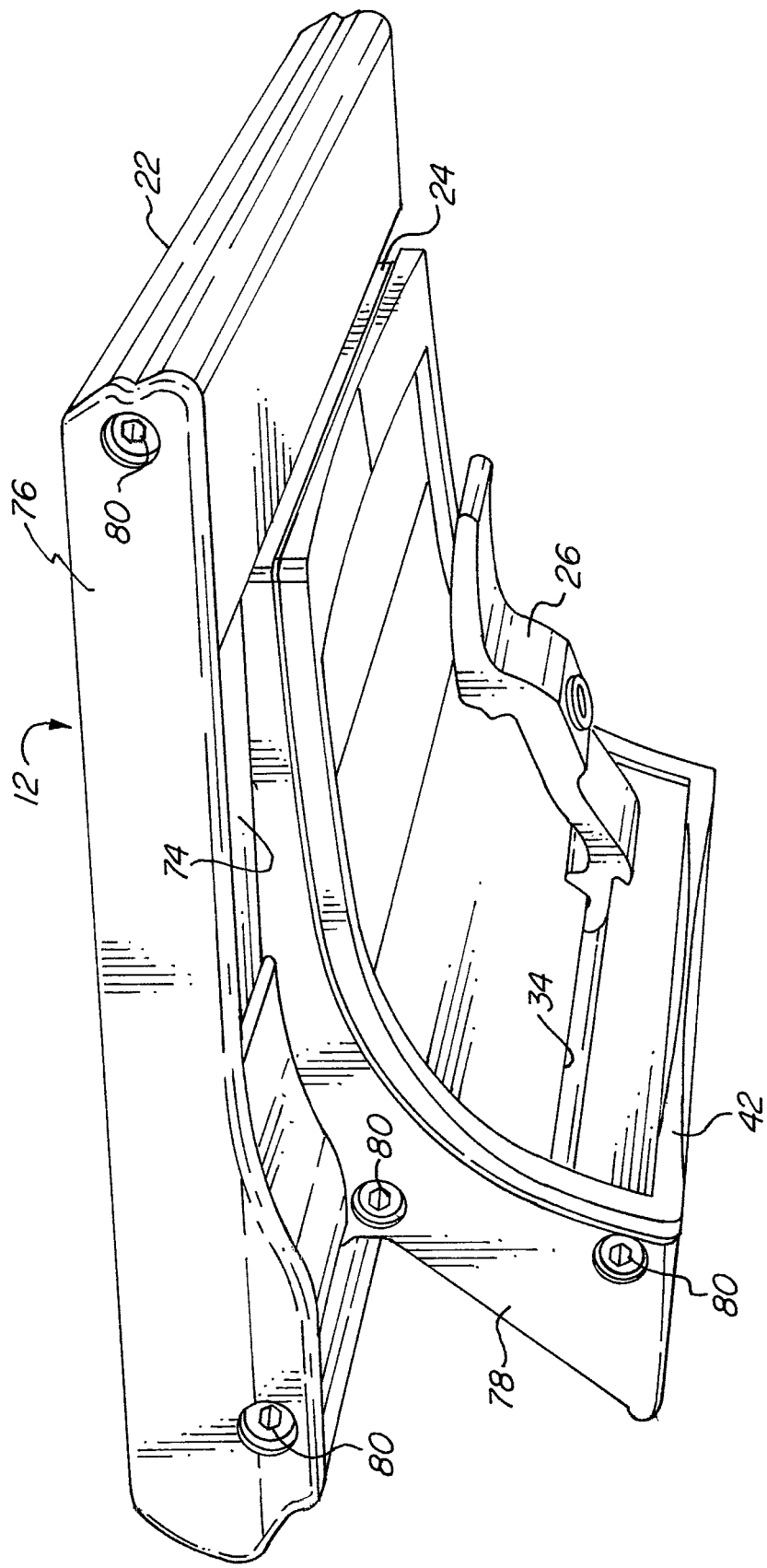
FIG. 6 is a perspective view of the mounting platform with side covers attached.

FIG. 6 is a perspective view illustrating the attachment of the side cover 76 to the platform portion 22 and the side cover 78 to the base portion 24. The side covers 76 and 78 are attached with fasteners or screws placed in mounting holes 80 that attach to screw bosses, illustrated in FIG. 5. The filler 74 is clearly seen in FIG. 6 and seals the opening between the side cover 76 and the side cover 78. Accordingly an integral, securely attached mounting platform 12 is obtained without the need for drilling any additional holes or making other modifications to the vehicle.

Figure 7:
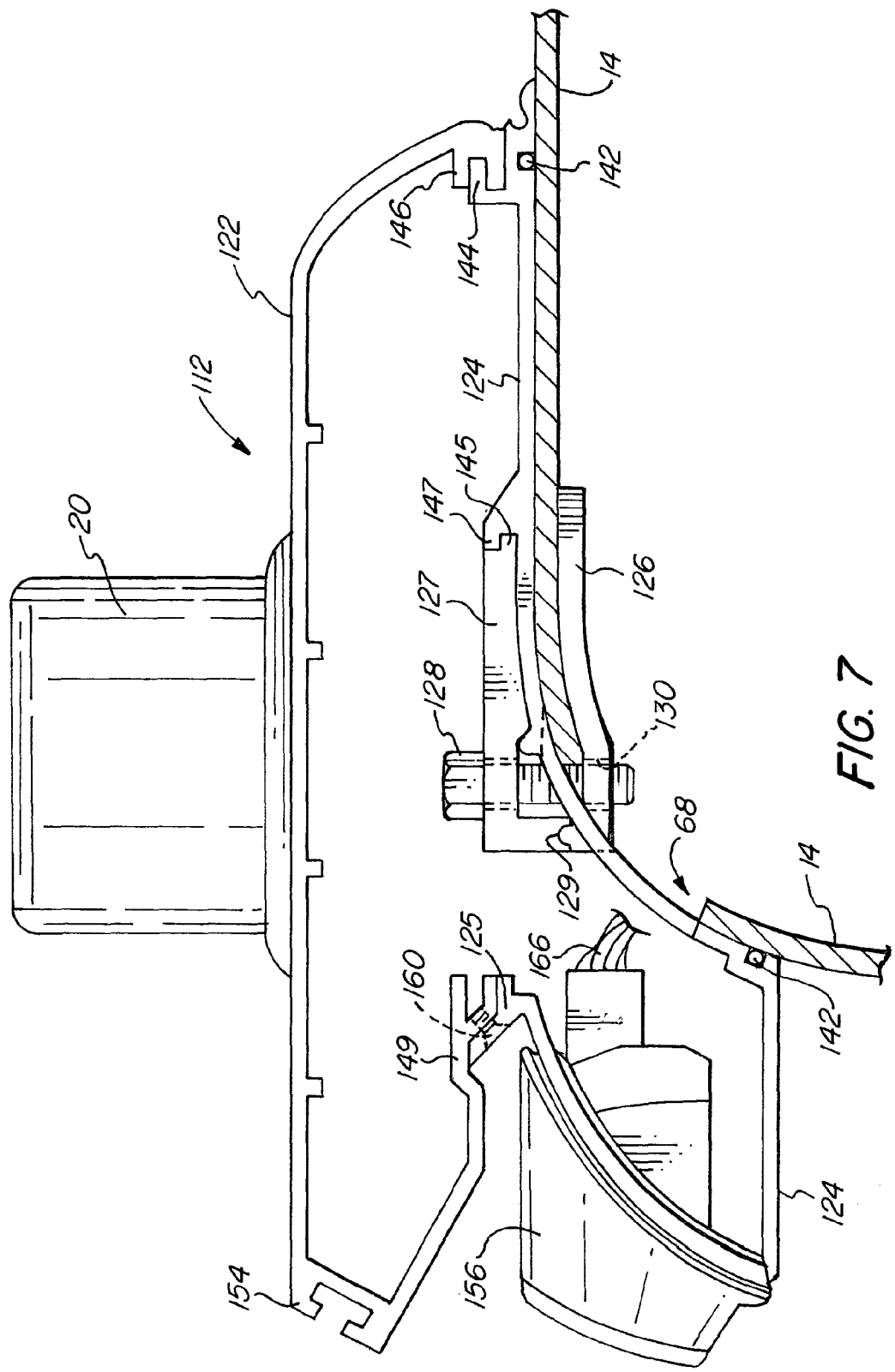
FIG. 7 is a schematic cross-section of another embodiment of a mounting platform attached to a vehicle.

FIG. 7 is a schematic cross section illustrating another embodiment of the present invention. The mounting platform 112 comprises a platform portion 122 and a base portion 124. The base portion 124 is held onto the roof 14 of a vehicle by inserting a lower clamp 126 through the opening 68. An upper clamp 127 has a front stepped surface 145 that mates with an upper clamp channel 147 formed in the base portion 124. A rear portion of the upper clamp 127 is securely attached to a rear portion of the lower clamp 126 by bolt 128. The rear portion of the upper clamp 127 and the rear portion of the lower clamp 126 mate forming mating line 129. Bolt 128 is threaded into a threaded hole 130 formed in the lower clamp 126. The mating line 129 may act as a pivot so that the upper and lower clamps 126 and 127 are pivoted together upon tightening bolt 128. Accordingly, the base portion 124 is securely held to the roof 14. Seals 142 are placed between the roof 14 and base portion 124.

The platform portion 122 is attached to the base portion 124 by stepped surface 144 formed on the base portion 124 mating with a front channel 146 formed on the platform portion 122. A base portion rear mounting surface 125 mates with a platform portion rear mounting surface 149 and is held securely together with screw 160. Accordingly, the platform portion 122 is securely held to the base portion 124 at a front and rear location.

A brake light assembly 156 may be attached to the base portion 124 and may be the same or different than the brake light assembly removed from the opening 68. The brake light wires 166 are attached through opening 68 to the electrical system of the vehicle.

The mounting platform of the present invention is preferably made from extruded aluminum, but can be made from any material, such as metal, plastic, or composite. The component parts may be extruded or molded.

Accordingly, the present invention provides means for attaching a mounting platform to a vehicle without the drilling of any holes. Different clamping arrangements may be provided to attach a base portion to the vehicle through an existing opening, such as the hole for mounting a brake light. The present invention may be used for a variety of different applications but is best suited for the attachment of a mounting platform onto the roof of a cab of a truck through the opening formed by the removal of a center mounted brake light assembly.

While the present invention has been described with respect to several different embodiments, it will be obvious that various modifications may be made without departing from the spirit and scope of this invention.

What is claimed is:

1. A mounting platform for attachment to a vehicle comprising:
 a seal placed adjacent the vehicle;
 a base portion place on the seal;
 a brake light attached to said base portion;
 a clamp attached to said base portion and adapted to be inserted into an existing opening in the vehicle, said clamp having a foot adapted to be placed within the existing opening in the vehicle so as to hold a portion of the vehicle between the foot of said clamp and said base portion; and a platform portion attached to said base portion, whereby an accessory may be mounted on the mounting platform and the mounting platform may be attached to the vehicle without the drilling of any holes.

2. A mounting platform for attachment to a vehicle comprising:

a seal placed adjacent the vehicle;

a base portion place on the seal;

a recess formed in said base portion;

a clamp attached to said base portion and adapted to be inserted into an existing opening in the vehicle, said clamp having a foot adapted to be placed within the existing opening in the vehicle so as to hold a portion of the vehicle between the foot of said clamp and said base portion;

a hinge element formed on one end of said clamp, said hinge element pivotally attached to said recess, a fastener attached to said clamp at an intermediate position between said hinge element and the foot, whereby upon securing said fastener, the foot is caused to be pivoted upward and clamped onto the vehicle; and a platform portion attached to said base portion, whereby an accessory may be mounted on the mounting platform and the mounting platform may be attached to the vehicle without the drilling of any holes.

3. A mounting platform for attachment to a vehicle as in claim 2 wherein:

said fastener comprises a bolt.

4. A mounting platform for attachment to a vehicle as in claim 2 further comprising:

a window screen attached to said mounting platform.

5. A mounting platform for attachment to a vehicle as in claim 2 further comprising:

a light bar attached to said mounting platform.

6. A mounting platform for attaching accessories to a roof of a vehicle comprising:

a seal placed on and conforming to the roof of the vehicle;

a base portion placed on said seal;

a recess formed in said base portion;

a clamp having a foot on one end and a hinge element on another end, whereby the foot is free to be inserted into an opening in the vehicle and the hinge element is held in said recess formed in said base portion;

a fastener attached to said clamp and said base portion, whereby said fastener may be used to draw said clamp tightly against the vehicle securely holding said base portion on the vehicle; and a platform portion secured to said base portion, whereby an accessory may be mounted on the mounting platform and the mounting platform may be attached to the vehicle without the drilling of any additional holes.

7. A mounting platform for attaching accessories to a roof of a vehicle as in claim 6 further comprising:

a brake light opening formed in said base portion.

8. A mounting platform for attaching accessories to a roof of a vehicle as in claim 6 further comprising:

a front step surface formed in said base portion; a front channel formed in said platform portion receiving said front step surface;

a base portion rear mounting surface formed on said base portion;

a platform portion rear mounting surface formed on said platform portion; and a fastener holding the base portion rear mounting surface and the platform portion rear mounting surface together, whereby said base portion and said platform portion are securely held together.

9. A mounting platform for attaching accessories to a roof of a vehicle as in claim 6 further comprising:

a light bar attached to said mounting platform.

10. A mounting platform for attaching accessories to a roof of a vehicle as in claim 6 further comprising:

a window screen attached to said mounting platform.

* * * * *